Jan. 7, 1930. C. CRAIN 1,742,949
MEAT TENDERING DEVICE
Filed Oct. 10, 1928

Inventor.
CARL CRAIN
By Victor J. Evans
Attorney.

Patented Jan. 7, 1930

1,742,949

UNITED STATES PATENT OFFICE

CARL CRAIN, OF PASADENA, CALIFORNIA

MEAT-TENDERING DEVICE

Application filed October 10, 1923. Serial No. 311,576.

This invention relates to improvements in meat tendering devices.

The principal object of the invention is to provide a device which will when passed over a piece of meat serve to break up the fibrous structure thereof to make the same tender.

Another object is to provide a device so that flour or the like substance may be forced into the surface of the meat while being acted upon.

A further object is to provide means whereby the flour within the device will be forced through the perforations thereof.

A still further object is to produce a device which is simple in construction and therefore economical to manufacture.

Other objects and advantages will be apparent during the course of the following description.

Figure 1:
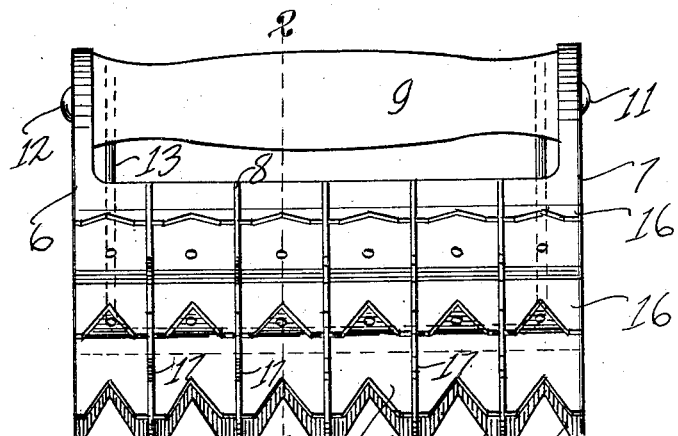
Figure 2:
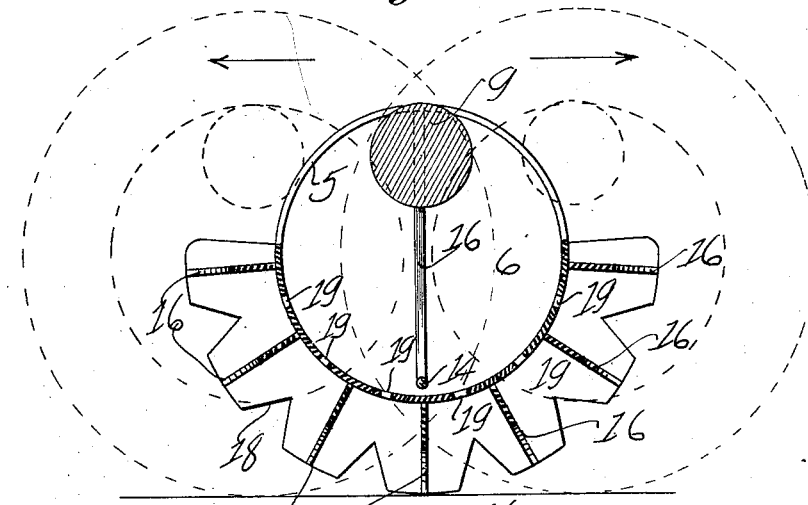
Figures 3, 4:
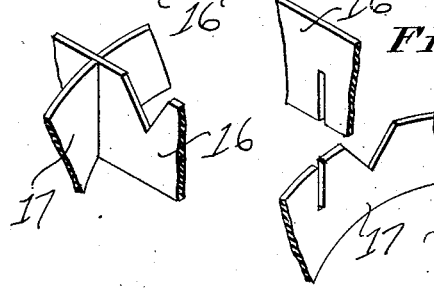

In the accompanying drawings forming a part of this specification and in which like numerals are employed to designate like parts throughout the same, Figure 1 is a side elevation of my device, Figure 2 is a cross section taken on the line 2—2 of Figure 1, Figure 3 is a detail perspective view of the cross blades, and Figure 4 is a fragmentary perspective view showing the manner in which these cross pieces are connected.

At the present time it is common to pound meat for the purpose of breaking the fibrous structure and thus making the same more palatable. It is also common to sprinkle flour upon the surface of meat and to pound the same into the meat. Applicant's device accomplishes both objects in the operation and in a very simple manner.

In the accompanying drawings wherein for the purpose of illustration is shown a preferred embodiment of my invention, the numeral 5 designates the structure as a whole which is substantially tubular in shape, having ends 6 and 7 and being cut away at 8 so that the lower portion of the tubular structure is substantially semi-circular in shape. A handle is shown at 9 which is pivoted as at 11 and 12. This handle carries a scraper 13 which is made of wire and has a cross bar 14 in close proximity to the bottom of the semi-circular portion. Secured to the semi-circular portion are horizontal blades 16 which are spaced about the semi-circular portion and are joined together by parallel semi-circular blades 17, the same being joined as shown in Figure 4 in the manner which is quite common and needs no further description.

The blades 16 and 17 are also cut away as shown at 18 so as to give the blades a tooth structure. Openings 19 are formed in the semi-circular portion of the tubular structure 5. The result of this construction is that when flour is placed within the semi-circular portion and the device as a whole given a back and forth movement over a piece of meat as indicated by arrows in dotted lines of Figure 2, the flour within the device will be caused to sift through the openings 19 and fall upon the meat at the same time teeth within the blades will enter the surface of the meat and serve to break up the fibrous structure thereof at the same time forcing the flour into the meat in the manner desired.

It will thus be seen that I have produced a device which will accomplish all of the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. A meat tenderer consisting of a substantially tubular body portion having blades secured thereto, perforations formed in said body portion and means for discharging flour through said perforations for the purpose specified.

2. In a device of the character described, a substantially tubular body portion, a handle secured thereto, a stirring element secured thereto, perforations formed in said body portion for the purpose of discharging the contents thereof therethrough and blades secured to said body portion for the purpose specified.

3. In a device of the character described, a substantially tubular body portion, a handle secured thereto, a stirring element secured thereto, perforations formed in said body portion for the purpose of discharging the contents thereof therethrough and blades secured to said body portion, said blades having teeth formed therein, certain of said blades being angularly arranged with respect to the other of said blades.

In testimony whereof I affix my signature.

CARL CRAIN.